United States Patent [19]

Bigret

[11] Patent Number: 4,662,230

[45] Date of Patent: May 5, 1987

[54] DEVICE FOR MEASURING THE TANGENTIAL FORCE APPLIED TO A TOOTHED ROTOR

[75] Inventor: Roland Bigret, Drancy, France

[73] Assignee: Alsthom, Paris, France

[21] Appl. No.: 767,387

[22] Filed: Aug. 19, 1985

[30] Foreign Application Priority Data

Sep. 19, 1984 [FR] France .................... 84 14389

[51] Int. Cl.⁴ .............................................. G01L 5/00
[52] U.S. Cl. ..................................... 73/862.54; 73/11
[58] Field of Search ........... 73/862.53, 862.54, 862.68, 73/862.19, 11, 432 V, DIG. 4

[56] References Cited

U.S. PATENT DOCUMENTS

| | | | |
|---|---|---|---|
| 2,691,159 | 10/1954 | Heibel | 73/11 X |
| 3,213,666 | 10/1965 | Rudnick | 73/11 |
| 4,485,683 | 12/1984 | Hass | 73/862.53 |
| 4,505,153 | 3/1985 | Lilley et al. | 73/862.68 X |

*Primary Examiner*—Charles A. Ruehl
*Attorney, Agent, or Firm*—Sughrue, Mion, Zinn, Macpeak, and Seas

[57] ABSTRACT

The device measuring the force applied to a rotor (18) with teeth (6) by a ratchet mechanism consists of a claw (2) adapted to bear against the underside of a tooth (6) on the rotor (18), a pawl guide (12) designed to receive the blow from the pawl (15) and to prevent said pawl from meshing with the teeth, and a force sensor (9) disposed between the claw (2) and the pawl guide (12), said claw (2) having a handle (11) by which an operator or tender can remove the device (1) once the pawl has delivered the blow. The handle is also a safety feature since thanks to it the device can be removed when the rotor is rotatively driven.

3 Claims, 2 Drawing Figures

DEVICE FOR MEASURING THE TANGENTIAL FORCE APPLIED TO A TOOTHED ROTOR

This invention relates to a device for measuring the force applied tangentially to a rotor equipped with teeth.

A known way of determining the dynamic characteristics of a rotor in torsion is to examine the vibrations of the rotor resulting from the application of an excitation force tangential to the rotor.

The device according to the invention is characterized in that it comprises a claw adapted to bear against the underside of a tooth of the rotor, a heel serving to receive the element applying the force and a force sensor disposed between the claw and the heel, said claw being provided with a handle enabling a manipulator to remove the device after the blow has been delivered.

The device is removed immediately following the blow, thus precluding all risk since it is not rotationally carried along by the rotor.

The device according to the invention, particularly suitable when the rotor is equipped with teeth rotatively driven by a ratchet mechanism, is characterized in that it comprises a claw adapted to bear against the underside of a tooth of the rotor, a pawl guide serving to guide the pawl and a force sensor disposed between the claw and the pawl guide, said claw being provided with a handle enabling a manipulator or operator to remove the device once the pawl has delivered the blow.

According to a preferred embodiment of the invention the claw comprises, on its face which comes in contact with the teeth, a nose or torus designed to lodge beneath a tooth, followed by a recess or fillet designed to fit around the following tooth.

A toothed rotor driven by a ratchet mechanism is described for example in the document FR-A No. 2,329,846.

The invention will now be described in greater detail with reference to a particular embodiment cited by way of a non-limiting example and represented by the appended drawings.

Figure 1:
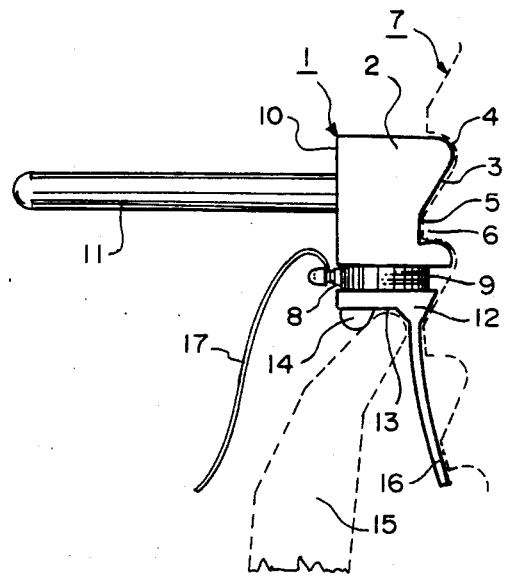
FIG. 1 represents a device according to the invention.

The measuring device 1 represented in FIG. 1 comprises a claw 2 in the shape of a cube comprising on its front face 3 a torus 4 followed by a recess 5 in which is operable to become lodged a tooth 6 of a toothed wheel 7, on its bottom face 8 a force sensor 9 and on its rear face 10 at the opposite side from the front face 3, a handle 11.

Figure 2:
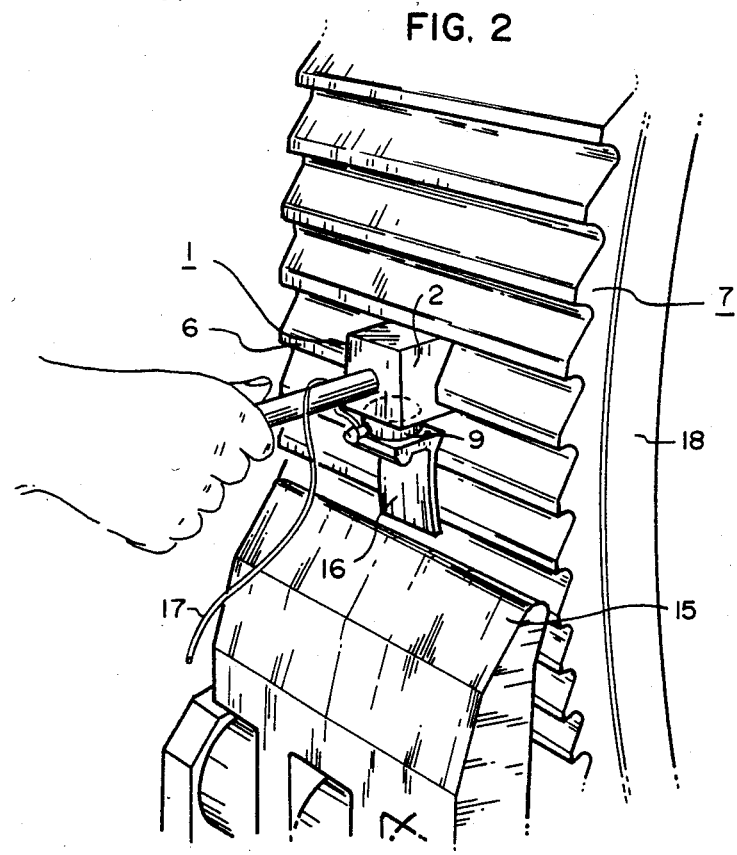
FIG. 2 represents the device of FIG. 1 installed on the toothed wheel of a rotor.

The force sensor 9 is provided on its bottom with a pawl guide 12 comprising a heel 13 having at its back a torus 14 designed to block the pawl 15 and on its front with an apron 16 which comes to cover the two teeth coming after the tooth lodging in the recess 5 of the front face 3 of the claw 2 (see FIG. 2).

The force sensor 9 consists of a piezoelectric cell (or of any other device for measuring forces), provided with an electric output lead 17 supplying a signal representative of the force applied on heel 13.

The pawl 15 and the toothed wheel 7 constitute an inching mechanism designed to rotatively drive the rotor 18 when the turbine is not in operation. To rotatably drive the rotor 18, the pawl 15 is imparted a reciprocating movement as described for example in document FR-A No. 2,329,846.

The pawl meshes in the toothed wheel 7. It catches between two teeth 6, pushes the toothed wheel 7, moves back and then catches between two other teeth 6. The trailing tooth during one thrust becomes the leading tooth during the next thrust.

To operate the device according to the invention merely requires grasping the handle 11 of the claw 2 to place the claw on the toothed wheel 7 with the pawl guide 12 straddling the two teeth between which the pawl 15 would have born for the next blow.

The end of pawl 15 slides on the pawl 12 and strikes the heel 13, giving a thrust to the toothed wheel 7 which is instantly measured by the cell 9.

Once the blow has been delivered, the operator removes the device 1, thus avoiding the risk of having the surrounding structures impacted by a device rotationally driven along by the rotor 18.

What is claimed is:

1. A device for measuring the tangential force applied to a toothed rotor, said device comprising:
   a claw adapted to bear against the underside of a tooth of said rotor;
   a heel designed to receive the element applying the force;
   and a force sensor disposed between the claw and the heel, said claw having a handle enabling an operator to remove the device once the blow has been delivered.

2. A device for measuring the force applied to a toothed rotor by a ratchet mechanism, said device comprising:
   a claw adapted to bear against the underside of a tooth of the rotor;
   a pawl guide serving to receive the blow from the pawl of the ratchet mechanism and preventing the pawl from meshing with the rotor teeth;
   and a force sensor disposed between the claw and the pawl guide;
   said claw being provided with a handle enabling an operator to remove the device after the pawl has delivered the blow.

3. A measuring device according to claim 2, wherein said claw has on its front face in contact with the teeth a nose designed to lodge beneath a tooth, followed by a recess designed to fit around the shape of the following tooth.

* * * * *